June 12, 1945.   H. HOLMAN   2,378,081
DEVICE OR MEANS FOR SUPPORTING THE ROPES OR
CABLES OF AERIAL ROPEWAYS OR THE LIKE
Filed Jan. 12, 1944
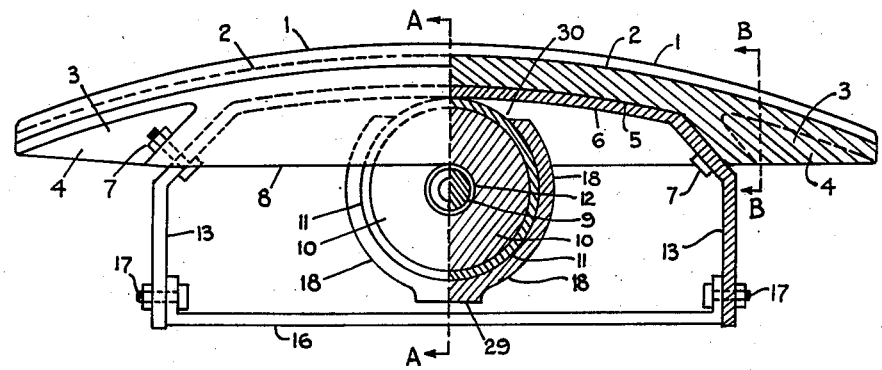
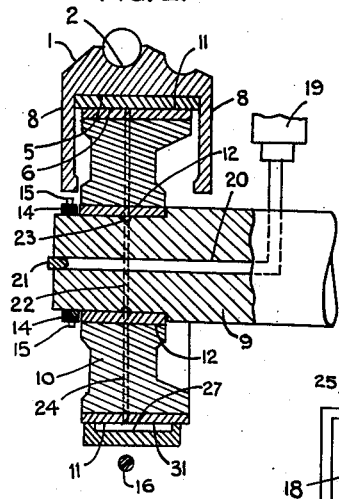
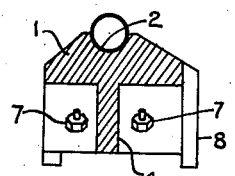
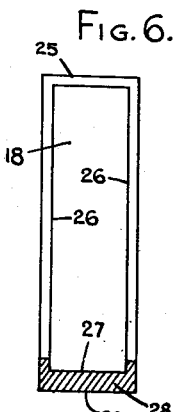
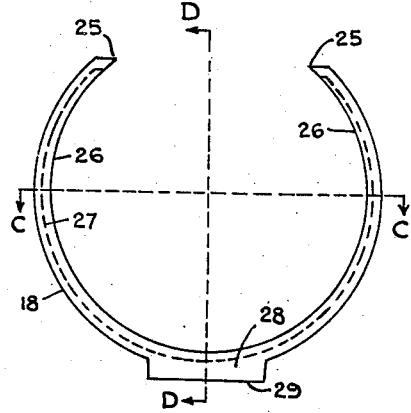
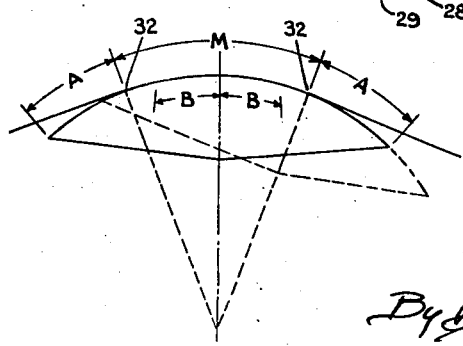
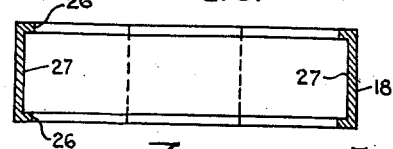
Inventor
H. Holman
By Glascock Downing &c
Attys Patented June 12, 1945

2,378,081

UNITED STATES PATENT OFFICE 2,378,081

DEVICE OR MEANS FOR SUPPORTING THE ROPES OR CABLES OF AERIAL ROPEWAYS OR THE LIKE

Horace Holman, Surajpur, India

Application January 12, 1944, Serial No. 518,014
In British India February 2, 1943

11 Claims. (Cl. 248—49)

This invention relates to an improved device or means for supporting the ropes or cables of aerial ropeways, suspension bridges, cable spans or the like upon their trestles or towers.

The invention is particularly applicable to the carrier ropes of ropeways in which the loads or buckets travel along the rope which is suspended on trestles or towers, being anchored securely to a foundation at one end of each length of rope and having a freely suspended counter-weight at the other end to take up slack and to permit of temperature expansion or contraction in the length of rope. In such ropes there is a see-saw action of the rope in the standard saddles on each trestle as buckets approach and recede from the said trestle. There is also an expansion and contraction movement of the rope over each trestle due to temperature changes, the magnitude of which varies from zero at the fixed end of the rope to a maximum, which may be very considerable when the length of rope is great, at the free end.

The see-saw movement of the rope over each support produces wear of the rope which is enhanced owing to temperature movements of the rope.

The main object of the present invention is to eliminate more or less completely the rope wear due to the see-saw action of the rope in the saddle groove as buckets approach and recede from the trestle and/or due to temperature movements.

As an example of the magnitude of the wear on the rope it may be mentioned that on a typical ropeway buckets follow each other at 40 second intervals, or 1½ times per minute. Assuming that at each passage of a bucket there is a total to and fro movement of, say, 4 inches, the total movement in a 9 hour's working day would be 3240 inches plus such movement as is due to temperature expansion. Such movements cause a very heavy wear which shortens the life of a rope very materially.

Suggestions have been made to eliminate or to reduce wear on travelling ropes in such positions by using a saddle in the shape of a quadrant and by providing an endless chain of linked members the upper part of the loop in which is interposed between the saddle and the rope, which endless chain travels to and fro with the rope.

It has also been proposed to introduce between such an endless chain, which comprises a series of link-connected rollers, and the rope, a grooved chain device for engaging the rope, which grooved chain device travels with the rope. Such proposals introduce linked members in the shape of endless chains which are high in first cost and expensive to maintain.

According to the present invention a saddle with a groove for the rope is provided, which saddle, instead of, as is usual, merely being pivoted upon the pin or member which supports it upon the trestle or tower, is adapted to roll upon, or relatively to, said pin following a curved path which is approximately parallel to, or concentric with, the curve of the rope over the support, or parallel to or concentric with the curve given to the groove in the saddle for supporting the rope. Instead then of the rope see-sawing in the groove in the saddle the saddle as a whole moves in a curved path backwards and forwards with the rope, so that relative movement and friction and wear of the rope in the groove is eliminated wholly or to a large extent.

It is highly important that the rope groove in the saddle in its movements shall be maintained at all times upon the same circular arc in space, as when this is ensured the elevation of the rope over the trestle does not vary. This is realized by providing a curved surface upon which the saddle rolls, which surface engages the pin on the trestle (or a roller upon the pin), said curved surface upon which rolling takes place being concentric with or parallel to the curve of the rope groove or of the arc upon which the oscillation to and fro is to take place.

A further object of the invention is to provide a construction which will largely eliminate wear of the rope whilst being much cheaper to manufacture and to maintain than the heretofore known constructions which depend upon using endless chains of rollers or moving endless chains interposed between the rope and its supports.

Another object is to provide a construction which is robust and which will have long life, whilst being simple in its details.

Still another object is to provide a construction in which the sliding or rolling surface is largely, if not completely, protected from the weather, and in which the moving parts including the said surface which acts as a slide surface may be kept lubricated in an efficient manner.

With these and other objects in view the invention consists in a device for, or a means of, supporting the ropes or cables of aerial ropeways, suspension bridges, cable spans or the like upon their trestles or towers, comprising a saddle with a rope groove therein to support the rope or cable, said groove conforming to the curve taken, or to be taken, by the rope or cable to be supported, and having a surface for rolling thereon, or applied thereto, which is adapted to be supported on and to roll longitudinally of its length over, or upon, a saddle supporting element carried by, or fixed to, the trestle or tower, characterised in that the said surface for rolling is curved in the direction of its length and is formed to be substantially parallel to, or concentric with, the curve of the rope groove in the saddle. In this device or means the said saddle supporting element may be a pin carried by, or fixed to, the trestle or tower.

Preferably a roller is mounted upon said saddle supporting element or pin and the said surface for rolling (and the saddle) is adapted to roll upon said roller. According to one embodiment which the invention may take the surface for rolling is in the form of an element separate from, but adapted to be fixed securely to, the saddle.

The saddle itself may be a casting or a forging, whilst the surface upon which rolling takes place may be made from rolled metal or may be a forging.

In the preferred embodiment stops are provided for limiting the movements of the saddle and its surface for rolling relatively to the saddle supporting element or pin. To provide such stops the saddle or surface for rolling may have downwardly projecting extensions or arms, one at each end, to limit the movements of the saddle about the saddle supporting pin.

According to one preferred embodiment the surface for rolling is in the form of a separate element fixed to the saddle comprising a longitudinally curved surface for rolling with downward extensions at each end to form stops to engage the roller upon which it rolls to limit its movements thereon, and a closing member is provided joining the lower ends of said downward extensions and adapted to pass below the said roller to maintain the said surface, and saddle attached thereto, in position upon said roller.

A roller may be mounted upon the supporting pin carried by the trestle or tower and be adapted to rotate upon the said pin as the surface for rolling and saddle move to and fro upon the roller. The said roller may be maintained in position on the pin by a collar fixed to the end of the pin, for example by grub screws. The roller itself may be of cast metal but may have a rim of rolled or forged metal to contact with the surface for rolling. A bush, for example of bronze, may be mounted on the pin and may be interposed between the pin and the said roller.

Means for supplying lubricant to the pin, bush and/or roller, and/or from the roller to the surface upon which rolling takes place, may be provided. Such means may comprise a grease or lubricant cup or equivalent to supply lubricant to a lubricant channel or bore in the pin, and radial ducts, in conjunction with such circumferential grooves or the like as may be desired on the parts, to lead the lubricant to the moving parts and to the surface of the roller.

A grease trap may be provided which embraces the greater part of the circumference of the roller leaving only a portion at the top of the roller, where the roller contacts with the surface for rolling, uncovered. This grease trap may closely engage the surface of the roller along the two edges of its inner circumference and provides an enclosed, partly-annular space for lubricant between such edges. The grease trap may, moreover, be of heavier section in the centre of its circumferential length and be thus weighted to enable it to maintain its position hanging from the roller to embrace the lower parts of the roller. The said grease trap thus would not rotate with the roller; but would remain stationary relatively to the pin upon which the roller itself rotates. The said heavier section of the grease trap may have a flat or other contact surface on its lower side adapted, for example, to engage a closing member on the surface for rolling as hereinbefore mentioned, to maintain the grease trap in correct position on the roller.

According to a preferred feature of the invention the saddle has a surface or member upon which rolling takes place formed on the lower side thereof, or applied thereto, and has downwardly extending longitudinal walls on each side of the said surface for rolling to extend downwards on each end of the roller to maintain the saddle upon the roller and/or to protect the upper part of the roller from rain. When the saddle has such downwardly extending longitudinal side walls, the upper parts of the grease trap, when in position on the roller, are maintained in position and prevented from sliding in the direction of the axis of rotation of the roller by said upper parts entering a hollow part of the saddle above.

The invention also comprises a device or means which, when assembled and erected, with the saddle supported centrally upon the roller and pin, and when supporting the rope, is engaged by, or contacts with, the rope over a central length of the rope groove in the saddle, but the two ends of the saddle and saddle groove extend outwards in each direction beyond such length of contact with the rope for a distance which is greater than the distance through which the saddle can move upon its roller in each direction from its central position.

The invention will now be described with reference to the accompanying drawing in which:

Figure 1 is a half side elevation and half longitudinal section of the device;

Figure 2 is a cross section to an enlarged scale on line A—A of Figure 1;

Figure 3 is a cross section on line B—B of Figure 1;

Figure 4 is a side view of the grease trap;

Figure 5 is a horizontal sectional plan of the grease trap on line C—C of Figure 4;

Figure 6 is a vertical cross section of the grease trap on line D—D of Figure 4; whist Figure 7 is a diagram illustrating certain desirable features in this form of saddle.

Referring first to Figure 1, the saddle 1 has a rope groove 2 therein, adapted to receive and to support the rope of the cableway or the like. This saddle has two projecting ends 3, 3 which preferably have medial ribs 4, 4 to support the projections. The central part of the saddle is hollowed out as shown at 5 and in this hollow a surface for rolling 6 is fixed. The said surface 6 might alternatively be made as part of the saddle. However, it is preferable to make it as a separate element, which element is secured to the saddle as by bolts such as 7. This hollow central part 5 of the saddle has downwardly projecting side walls 8, 8 which embrace the upper parts of the members upon which the saddle moves.

The saddle is mounted upon the pin 9 which is carried by the trestle or tower. Upon this pin the roller 10 is mounted. The roller, as shown in the drawing, may have a central part of cast metal but may be provided with a rolled or forged metal rim 11 the outer surface of which will be the rolling surface. This roller 10 may also be mounted upon a bronze or other bush 12 upon which it can roll, or, alternatively, the bronze bush may be fixed into the centre of the roller 10 and rotate upon the turned end of the pin 9.

The surface for rolling 6, as shown in the drawing, is of rolled or forged metal and the lower central surface of this member forms the actual working or rolling surface. This surface, when fixed in position in the saddle, is intended to be parallel to the rope groove 2 or concentric therewith. The rope groove 2 will be made of a shape to conform to the expected or desired curvature of the rope in the central part where it is supported upon the saddle.

The said surface part 6 is provided with downwardly projecting ends 13, 13, which ends will act as stops to prevent the saddle moving more than through a desired determined amount in either direction from its central position on the pin, as these stops will engage the side of the roller or of its associated parts to prevent undesired movement of the saddle upon the roller.

From an inspection of Figure 1, it will be seen that the downward side extensions 8, 8 of the saddle surround not only the rolling surface 6 but also the upper parts of the roller 10 and protect these from weather.

In assembling the saddle, the bush 12 and roller 10 are placed upon the pin 9 and the collar 14 is secured by the grub screws 15 to the end of the pin to maintain these parts in desired position. The saddle 1, having had the said surface 6 bolted thereto by means of the nuts and bolts 7, 7 is then lowered upon the roller, the side walls 8, 8 of the saddle surrounding the upper parts of the roller. When in this position, the closure member 16 is fixed in position by the bolts 17, 17. Before, however, the saddle is placed in position over the roller the grease trap 18 may be slipped on to the roller from the end thereof. When this grease trap is in position and when the saddle is placed in position, the downward extensions of the walls 8, 8 will prevent this grease trap 18 from being displaced in the direction of the axis of rotation of the roller.

As it is important that the parts should be well lubricated, a lubricator 19 is provided which is connected to a bore 20 in the pin. The end of this bore is closed by the plug 21 which is screwed into position. One or more radial ducts 22, 22 are made in the pin to lead lubricant to the circumferential groove 23 and thus to supply lubricant to the surface between the pin 9 and the bush 12. Other radial ducts 24, 24 may be made through the bush 12 and through the roller 10 and its rim 11 so as to conduct lubricant to the cylindrical periphery of this roller and thus to the surface 6 in respect to which rolling takes place.

To assist in lubrication, the grease trap 18 may be provided which is illustrated in Figures 4, 5 and 6. This grease trap forms an arc of a circle, with the ends of its two limbs 25, 25 extending well above the centre of the arc so that when once in position upon the roller the grease trap will hang thereon. The grease trap has in-turning edges 26, 26 which engage the surface of the roller; but the central part of the cross section of the grease trap has a depression 27 therein, which, when the grease trap is applied to the roller, provides a partly annular space between the grease trap and the roller in which lubricant may collect.

This grease trap preferably has a thicker part 28 at its centre, which thicker part is provided with a flat 29, which flat may engage the closure member 16 when the parts are erected. The thicker part 28 of the grease trap acts as a weighting member which will cause the grease trap to embrace the roller in such a way as to leave the upper surface of the roller unobstructed, as can be seen at 30 in Figure 1. The flat 29 may, however, be also utilised by bearing against the closure member 16 to maintain the grease trap in desired position. Grease passing through the radial ducts 24 will find its way into the part-annular space 31 (see Fig. 2) between the grease trap and the roller and will thus keep the roller surface well lubricated at all times.

If the rolling surface 6 is made as a separate member to be applied to the shoe, it may, after being placed in position in the shoe and after being bolted up therein, have any space between its upper surface and the shoe grouted up with cement or other suitable filling.

Figure 7 illustrates certain features in this saddle which it is desirable to maintain. In this figure the length shown as M is the length over which the rope to be supported normally will make contact with the saddle. The rope bends over the saddle but leaves the saddle when the saddle is in central position on its roller at the points 32, 32, from which points the rope parts are approximately tangential to the curve of the saddle for the lengths indicated at each side by A. The distance B shows the distance to each side of its central position that the saddle may move upon the pin or roller. This distance B should in magnitude be less than the distance A in order that there shall be no undue bending of the rope. The dotted lines on this Figure 7 indicate the position of the saddle when in one of its extreme positions and it will be seen that with a saddle of this nature in which the surface for rolling is parallel to, or concentric with, the bottom of the rope groove, the said rope groove in the saddle will remain at all times upon the same arc of curvature, and hence, as the rope follows its see-saw movements due to passing loads and the saddle at the same time rolls from side to side upon the roller upon which it is carried, there will be no alteration in the vertical elevation of the rope. Should the combined see-saw action of the rope upon the saddle and the temperature movement in the rope exceed the limits of travel permitted by the stops 13, 13 then the rope will slide in its saddle; but generally this sliding will only be due to the temperature expansions towards the free end of the rope as the saddle may readily be made to have sufficient travel on its roller between the stops 13, 13 to take up the ordinary see-sawing action of the rope whilst loads travel towards and away from the trestle upon which the saddle is mounted.

It will, of course, be understood that the invention is not restricted to one in which travelling loads move along the ropeway; but may be readily adapted to suspension bridges, cable spans and the like.

Furthermore, the invention is not restricted to the exact details shown as these may be considerably modified without departing from the spirit of the invention.

I claim:

1. A means for supporting the ropes or cables of aerial ropeways, suspension bridges, cable spans or the like upon their trestles or towers for preventing ropewear comprising a saddle supporting element carried by the trestle or tower, a saddle having a rope groove therein to support the rope or cable and conforming to the curve to be taken by the rope or cable to be supported, said saddle also having a surface for rolling thereon by which it is supported on and rolls longitudinally of its length upon the saddle supporting element and the surface for rolling being curved in the direction of its length and being formed substantially parallel to and concentric with the curve of the rope groove in the saddle for insuring movement in unison of the saddle and rope longitudinally relatively to the supporting element whilst maintaining the curved form of the rope and its vertical elevation invariable irrespective of the rotational movement of the saddle.

2. A device or means according to claim 1, wherein the saddle supporting element includes a supporting pin carried by the trestle or tower and a roller mounted on the pin and adapted to rotate upon the said pin as the surface for rolling and saddle move to and fro upon the roller.

3. A device or means according to claim 1, wherein stops are provided for limiting the movement of the saddle and its surface upon which rolling takes place relatively to the saddle supporting element.

4. A device or means according to claim 1, wherein the saddle and the surface for rolling have downwardly projecting extensions one at each end, to limit the movements of the saddle about the saddle supporting element.

5. A device or means according to claim 1, wherein the surface for rolling is in the form of a separate element comprising a longitudinally curved surface with downward extensions at each end to form stops to engage the roller upon which it rolls to limit its movements thereon, and a closing member is provided joining the lower ends of said downward extensions and adapted to pass below the said roller to maintain the said surface, and saddle attached thereto, in position upon said roller.

6. A device or means according to claim 1, in which a grease trap is provided which embraces the greater part of the circumference of the roller leaving only a portion at the top of the roller, where the roller contacts with the surface for rolling, uncovered.

7. A device or means according to claim 1, in which a grease trap is made of heavier section in the centre of its circumferential length and is thus weighted to enable it to maintain its position hanging from the roller to embrace the lower parts of the roller.

8. A device or means according to claim 1, wherein a grease trap is provided and has a heavier section with a contact surface such as a flat on its lower side, adapted to engage a closing member on the surface for rolling to maintain the grease trap in correct position on the roller.

9. A device or means according to claim 1, wherein the saddle has a surface upon which rolling takes place on the lower side thereof, and has downwardly extending longitudinal walls on each side of the said surface for rolling to extend downwards on each end of the roller to maintain the saddle upon the roller and/or to protect the upper part of the roller from rain.

10. A device or means according to claim 1, in which the saddle supporting element includes a pin and a roller thereon and in which the saddle is of such a length, that when assembled and erected with the saddle supported centrally upon the roller and when supporting the rope, it is engaged by the rope over a central length of the rope groove in the saddle only, but the two ends of the saddle and saddle groove extend outwards in each direction beyond such length of contact with the rope for a distance which is greater than the distance through which the saddle can move upon its roller in each direction from its central position.

11. A device according to claim 1 wherein the saddle supporting element includes a pin and a roller mounted thereon and wherein a grease trap is provided and a longitudinal hollow is formed in the lower side of the saddle, and the upper parts of the grease trap, when in position on the roller carried by the saddle supporting element, enter said hollow to be engaged on both sides by the walls forming the hollow and are maintained in position and prevented from sliding in the direction of the axis of rotation of the roller.

HORACE HOLMAN.